(12) United States Patent
Slark et al.

(10) Patent No.: US 6,340,733 B2
(45) Date of Patent: Jan. 22, 2002

(54) FUNCTIONALIZED POLYMER, A METHOD FOR PRODUCING SAME AND CURABLE COMPOSITIONS CONTAINING SAME

(75) Inventors: Andrew Trevithick Slark, Northallerton; Michael Stephen Chisholm, Yarm Cleveland; Helen Harte, Middlesbrough, all of (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/725,574

(22) Filed: Nov. 30, 2000

Related U.S. Application Data

(62) Division of application No. 09/334,979, filed on Jun. 17, 1999, now Pat. No. 6,214,959, which is a continuation of application No. PCT/GB97/03466, filed on Dec. 17, 1997.

(30) Foreign Application Priority Data

Dec. 18, 1996 (GB) ............................................... 9626193

(51) Int. Cl.⁷ .............................................. C08F 220/10
(52) U.S. Cl. ................... 526/328.5; 526/207; 526/236; 526/320; 525/303
(58) Field of Search ................ 526/217, 236, 526/320, 328.5; 525/303

(56) References Cited

U.S. PATENT DOCUMENTS

| | | | |
|---|---|---|---|
| 4,028,315 A | 6/1977 | Bodanszky et al. ....... | 260/78 A |
| 4,130,518 A | 12/1978 | Rybny et al. ........... | 260/22 CB |
| 5,227,432 A | 7/1993 | Jung ........................... | 525/286 |
| 5,254,632 A | 10/1993 | Kerscher et al. ............ | 525/309 |
| 5,276,096 A | 1/1994 | Serdiuk et al. ............. | 525/123 |
| 5,484,850 A | 1/1996 | Kempter et al. ............ | 525/286 |

FOREIGN PATENT DOCUMENTS

| | | |
|---|---|---|
| EP | 0287019 | 10/1988 |
| GB | 276691 A1 | 3/1990 |
| JP | 64 22902 | 1/1989 |

*Primary Examiner*—Helen L. Pezzuto
(74) *Attorney, Agent, or Firm*—Pillsbury Winthrop LLP

(57) ABSTRACT

The present invention describes a process for the making of a copolymer of the general formula (I)

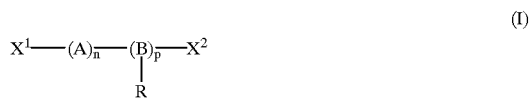

wherein A is a residue of at least one (meth)acrylate monomeric species, B is a residue of at least one monomeric species copolymerizable with A, R is a (meth)acrylate functionalized pendant ester group, $X^1$ and $X^2$ are terminal groups which may be the same or different, n and p are both at least one and are chosen such that the copolymer has a number average molecular weight of more than 2000.

4 Claims, No Drawings

FUNCTIONALIZED POLYMER, A METHOD FOR PRODUCING SAME AND CURABLE COMPOSITIONS CONTAINING SAME

This is a divisional of a National Application No. 09/334,979 filed Jun. 17, 1999, now U.S. Pat. No. 6,214,959, which is a Continuation of International Application No. PCT/GB97/03466 filed Dec. 17, 1997 which designated the U.S. and was published under PCT Article 21(2) in English.

The present invention relates to a functionalised polymer, a method of producing same and curable compositions containing same.

Conventional curable compositions, in particular those susceptible to curing by exposure to radiation such as UV light, contain functionalised oligomeric species. Such oligomeric species tend to be based on acrylated-epoxy, acrylated-polyester or acrylated-urethane resins and to have molecular weights (number average) of from 500 to 2000. The composition is cured by the reaction of the acrylate functional groups.

Additionally, such conventional curable compositions may also contain reactive monomeric species such as isobornyl acrylate, hexanediol diacrylate, tripropylene glycol diacrylate and trimethylol propane triacrylate.

These conventional curable compositions often shrink during curing. However, this tendency may be combated by the inclusion of a relatively high molecular weight (number average) copolymer, i.e. greater than 2000. The copolymer is present as a solute and the oligomeric species and (when present) reactive monomeric species act as a solvent. The copolymer is typically a random copolymer formed from two or more of methyl methacrylate, n-butyl methacrylate, ethyl methacrylate and methacrylic acid monomers.

In order to further improve the properties of the curable composition, it would be very desirable to cross-link the copolymer with the functional, e.g. acrylate, groups of the oligomeric species and (when present) reactive monomeric species during curing. However, such cross-linking would require the copolymer to have pendant reactive groups of similar structure to the functional groups of the oligomeric species and also of the reactive monomeric species. This would be difficult to achieve by using multifunctional monomers to make the functional copolymer because pendant reactive groups present on the monomers, which would participate in such a cross-linking reaction, would also participate in the polymerisation process to provide a prematurely cross-linked structure. In order to overcome this problem a copolymer with a suitable pendant group could be functionalised by esterification at 80–100 deg C for example as described in CHEMISTRY & TECHNOLOGY OF UV & EB FORMULATION FOR COATINGS. INKS & PAINTS, VOLUME 2. Prepolymers and Reactive Diluents for UV and EB Curable Formulations, N. S. Allen et al, page 124—Formation of a Polyester Acrylate. However at the reaction temperature for esterification the functionalised pendant reactive groups may react to form a prematurely cross-linked structure.

It is also desirable to be able to functionalise the copolymer in a solvent which is the functionalised oligomeric species and possibly the reactive monomeric species but this is currently not possible because at such high esterification temperatures the oligomeric and monomeric species would be likely to polymerise and react with the functionalised copolymer leading to premature polymerisation and cross-linking. Thus far no practical method of preparing such a functionalised copolymer has been identified.

It is an object of the present invention to provide such a functionalised copolymer, a new method for its preparation and a curable composition containing such a functionalised copolymer.

Accordingly in a first aspect the present invention provides a copolymer of general formula (I)

wherein A is a residue of at least one (meth)acrylate monomeric species, B is a residue of at least one monomeric species copolymerisable with A, R is a (meth)acrylate functionalised pendant ester group, $X^1$ and $X^2$ are terminal groups which may be the same or different, n and p are both at least one and are chosen such that the copolymer has a number average molecular weight of more than 2000.

In a second aspect, the present invention provides a process for the preparation of a copolymer (I)

wherein A is a residue of at least one (meth)acrylate monomeric species, B is a residue of at least one monomeric species copolymerisable with A. R is a (meth)acrylate functionalised pendant ester group, $X^1$ and $X^2$ are terminal groups which may be the same or different, n and p are both at least one and are chosen such that the copolymer has a number average molecular weight of more than 2000 which process comprises the steps of (i) polymerising by free radical polymerisation the at least one (meth)acrylate monomeric species providing residue A with the monomeric species providing residue B to form a copolymer of general formula (II)

wherein A, B, $X^1$, $X^2$, n and p are as defined above and Y is a pendant reactive group capable of undergoing esterification;

(ii) dissolving the copolymer (II) in a solvent; and thereafter (iii) esterifying the pendant group Y with a moiety that carries both a reactive group Q capable of undergoing esterification with the group Y and also a (meth)acrylate group so as to form groups R in the presence of a reagent of the general formula (III)

wherein $Z^1$ and $Z^2$ are end groups which are capable of assisting in the solubilisation of the reagent by the solvent.

In a third aspect, the present invention provides a curable composition which comprises a solution of a copolymer of general formula (I)

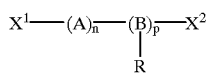

(I)

wherein A is a residue of at least one (meth)acrylate monomeric species, B is a residue of at least one monomeric species copolymerisable with A, R is a (meth)acrylate functionalised pendant ester group, $X^1$ and $X^2$ are terminal groups which may be the same or different, n and p are both at least one and are chosen such that the copolymer has a number average molecular weight of more than 2000 in a solvent, which solvent is a functionalised oligomeric species having number average molecular weight of 2000 or less and/or a reactive monomeric species.

In a fourth aspect, the present invention provides a coating formed by curing a curable composition comprising a solution of a copolymer of general formula (I)

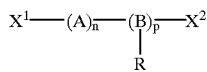

(I)

wherein A is a residue of at least one (meth)acrylate monomeric species, B is a residue of at least one monomeric species copolymerisable with A, R is a (meth)acrylate functionalised pendant ester group, $X^1$ and $X^2$ are terminal groups which may be the same or different, n and p are both at least one and are chosen such that the copolymer has a number average molecular weight of more than 2000 in a solvent, which solvent is a cross-linkable oligomeric species and/or reactive monomeric species having number average molecular weight of less than 2000.

Suitable (meth)acrylate monomeric species which can provide residues A include lower alkyl, i.e. $C_1$ to $C_{20}$ alkyl, (meth)acrylates, e.g. methyl methacrylate, ethyl methacrylate, propyl methacrylate, n-butyl methacrylate, iso-butyl methacrylate, t-butyl methacrylate, 2-ethyl hexyl methacrylate, octyl methacrylate, ethyl acrylate, butyl acrylate. Additionally, cyclic alkyl monomeric species may be used such as cyclohexyl methacrylate and isobornyl methacrylate. Preferably, mixtures of such monomeric species are used in order to optimise the characteristics of the copolymer. In particular, combinations of methyl methacrylate with one or more of n-butyl methacrylate and ethyl methacrylate may be used to good effect.

Suitable monomeric species which can provide residues B include hydroxy alkyl (meth)acrylates such as hydroxyethyl methacrylate (HEMA), hydroxypropyl methacrylate, hydroxybutyl methacrylate, hydroxyethyl acrylate, hydroxypropyl acrylate and hydroxybutyl acrylate; acid containing monomers such as methacrylic acid and acrylic acid; and amine containing monomers such as amino ethyl methacrylate and amino ethyl acrylate.

A and B may be the same or different.

The terminal groups $X^1$ and $X^2$ are determined by the monomeric species used and also the reagents used in the free radical polymerisation of the monomers. Additionally, it may be possible to further functionalise the copolymer so that one or other or both are a group R.

The group R is a (meth)acrylate functionalised pendant ester group. Preferably the (meth)acrylate functionality is terminal to the group R. The group R is formed by the esterification of a pendant reactive group Y with a reactive group Q carried by a (meth)acrylate functionalised moiety. The group Y may be hydroxyl, carboxylic acid, amino (primary or secondary), mercaptan or amide with the reactive group Q being selected appropriately such that a condensation reaction results. Preferably, group Y and the reactive group Q are hydroxyl or carboxyl, where Q and Y must be different.

The parameters n and p are both at least 1 and are chosen such that the number average molecular weight of the copolymer is more than 2000, preferably from 2000 to 100000 and particularly from 3000 to 40000. Preferably the parameters n and p are chosen such that the ratio of n:p is from 1:1 to 500:1, particularly from 3:1 to 100:1 and especially from 3:1 to 50:1. Where the at least (meth)acrylate monomeric species is a mixture of monomers then for each monomer there will be an individual value of n and the sum of the individual values of n should be used in the foregoing relationships between n and p. Similar allowances should be made where a mixture of monomeric species provide the residues B.

Preferably the copolymer (II) is prepared using conventional free radical polymerisation techniques such as those used in the suspension, solution, emulsion and bulk polymerisation of (meth)acrylate polymers. The copolymer may be a block, random or alternating copolymer.

In the process of the present invention the copolymer (II) is functionalised by first dissolving the copolymer (II) in a suitable solvent. Examples of suitable solvents include aromatic hydrocarbons such as toluene and xylene; ketones such as acetone and methyl ethyl ketone; esters such as ethyl acetate, propyl acetate and butyl acetate; ethers such as tetrahydrofuran; and chlorinated hydrocarbons such as chloroform and dichloromethane. Suitable solvents also include reactive monomers which constitute components of conventional curable compositions e.g. isobornyl acrylate, hexanediol diacrylate, tripropylene glycol diacrylate and trimethylolpropane triacrylate. Additionally, other mono, di, tri and tetra functional reactive monomers may be used such as butyl acrylate, 2-ethyl hexylacrylate, octyl acrylate, phenoxy ethyl acrylate, propylene glycol acrylate, butanediol diacrylate, neopentyl glycol diacrylate, diethylene glycol diacrylate, triethylene glycol diacrylate, dipropylene glycol diacrylate, pentaerythritol triacrylate, pentaerythritol tetraacylate and the methacrylate analogues. The copolymer (II) may be up to 70% by weight of the solution of copolymer (II) and solvent. Preferably the copolymer (II) represents up to 50% by weight of the solution.

In the process of the present invention we include the reaction where Y is an amine in the term "esterification"

After, taking the copolymer (II) up into solution, the moiety that carries both a reactive group Q capable of undergoing esterification with the group Y and also a (meth)acrylate group so as to form groups R is added. Examples of such moieties include (meth)acrylic acid, hydroxy ethyl (meth)acrylate, hydroxy propyl (meth)acrylate, hydroxy butyl (meth)acrylate and amino ethyl (meth)acrylate.

An essential feature of the process of the present invention relates to the use of a reagent of the general formula (II)

$$Z^1-N=C=N-Z^2 \qquad (III)$$

wherein $Z^1$ and $Z^2$ are end groups which are capable of assisting in the solubilisation of the reagent by the solvent, such as optionally substituted $C_3$ to $C_{16}$ alkyl, $C_5$ to $C_6$ cycloaliphatic, phenyl or tolyl.

Unlike other esterifications which use catalysts such as p-toluene sulphonic acid, the reagent (III) promotes the esterification by removing the water of esterification. Consequently, unlike other esterifications, the esterification of the present invention is not equilibrium limited and highly quantitative yields can be obtained. Preferred reagents of general formula (III) include 1,3-diisopropyl carbodiimide, 1,3-dicyclohexylcarbodiimide and 2,2,6,6 tetraisopropyl diphenyl carbodiimide. Particularly preferred are those reagents of general formula (III) which after participating in the esterification tend to become insoluble and can be separated from the product by simple filtration, e.g. where the end groups are cyclohexyl.

Preferably the esterification is conducted in the presence of a base such as triethyl amine, tripropyl amine, tributyl amine, pyridine and dimethyl amino pyridine.

Another advantage of the process of the present invention is that the esterification can be conducted at relatively low temperatures, e.g. less than 40° C., preferably less than 30° C. and particularly from 0 to 25° C. This is a valuable characteristic where the copolymer (I) can be cross-linked by heat or where it is formed in the presence of an oligomer and/or reactive monomer which is heat sensitive.

The copolymer (I) may be used in a wide variety of curable compositions such as conventional curable inks, overprint varnishes, photoresists, adhesives and flexographic printing plates.

When used in conventional curable inks; such inks include plasticisers, dyes, pigments, curing initiators, e.g. photoinitiators for UV curable inks or thermal initiators for heat sensitive inks. Typically, the amount of copolymer (I) used in the curable ink will be from 1 to 50% by weight and preferably from 2 to 25% by weight of the ink. Consequently, where the copolymer (I) is formed in the presence of reactive monomers the resulting product contains a higher concentration of copolymer (I) than is usually used in a curable ink and thus may require dilution. Similar concentrations of copolymer (I) may be used in respect of overprint varnishes, which by their nature do not contain dyes or pigments.

The present invention is further illustrated by reference to the following examples.

EXAMPLE 1

Suspension Polymerisation to Produce Copolymer (II)

Hydroxy functionalised polymers were prepared by suspension polymerisation of the monomers methyl methacrylate (MMA), butyl methacrylate (BMA) and hydroxy ethyl methacrylate (HEMA) in the presence of the chain transfer agent dodecyl mercaptan (DDM), a dispersant (hydroxy ethyl cellulose), an initiator azobisdiisobutyrate (ADIB) in deionised water. The polymerisations were carried out under a blanket of nitrogen with high speed agitation. The resulting copolymers were then centrifuged and washed twice with deionised water before being dried in a fluid bed drier.

SET 1

In this set the quantities of MMA and BMA were varied to give four copolymers having different $T_g$. The other components were added at the following levels (% by weight) 1% DDM, 1% dispersant, 0.8% ADIB.

1. 60% MMA; 30% BMA; 10% HEMA ($T_g$ 88.5° C.)
2. 36% MMA; 54% BMA; 10% HEMA ($T_g$ 67.6° C.)
3. 25% MMA; 65% BMA; 10% HEMA ($T_g$ 46.0° C.)
4. 15% MMA; 75% BMA; 10% HEMA ($T_g$ 38.7° C.)

SET 2

In this set the proportion of HEMA was altered to give four copolymers with different degrees of hydroxy functionalisation. The other components were added at the following levels (% by weight) 1% DDM, 1% dispersant, 0.8% ADIB.

1. 10% HEMA; 54% BMA; 36% NMA
2. 15% HEMA; 50% BMA; 35% NMA
3. 20% HEMA; 48% BMA; 32% NMA
4. 25% HEMA; 45% BMA; 30% NMA

SET 3

In this set the proportion of DDM was altered to give seven polymers of varying Mw (number average). The other components were added at the following levels (% by weight) 36% MMA, 54% BMA, 10% HEMA, 1% dispersant, 0.8% ADIB.

| | | |
|---|---|---|
| 1. | 0.5% DDM | (Mn 24853) |
| 2. | 1.0% DDM | (Mn 11758) |
| 3. | 2.0% DDM | (Mn 8440) |
| 4. | 2.5% DDM | (Mn 7923) |
| 5. | 3.0% DDM | (Mn 4466) |
| 6. | 5.0% DDM | (Mn 2824) |
| 7. | 7.0% DDM | (Mn 2253) |

EXAMPLE 2

Modification Reactions to Produce Copolymer (I)

Modification reactions on the previously prepared copolymers of Example 1 were conducted to produce copolymers containing acrylate functional groups.

10 g of each copolymer was weighed into a bottle. This was made up to 40 g with acetone and agitated on rollers until the copolymer had been taken up into solution. The solution was then filtered through Whatman No. 1 filter paper. The filtered solution was poured into a 2 or 3 necked 100 ml round bottomed flask placed in an ice bath. The cooled solution was stirred with a magnetic stirrer. To the cooled solution was added 0.78 g triethylamine, followed by 2.38 g (1.5 molar excess) dicyclohexylcarbodiimide (DCC) dissolved in a small quantity of acetone. The contents of the flask were stirred for 30 minutes before adding 0.83 g (1.5 molar excess) acrylic acid. Stirring continued in the ice bath for up to 2 hours before being left to stir at room temperature for 24 hrs covered in foil.

The DCC had reacted to form a urea salt which was filtered off through Whatman No. 1 filter paper. The filtrate was then poured into an excess of hexane which caused the functionalised copolymer to precipitate out. The copolymer was redissolved in acetone then reprecipitated into hexane. It was then transferred into a foil tray to dry at room temperature in a fume cupboard.

The compositions of the functionalised copolymers were as follows, determined by NMR spectroscopy

SET 1

1. 59.7% MMA; 28.1% BMA; 12.2% acrylated HEMA
2. 36.8% MMA; 52.2% BMA; 11.0% acrylated HEMA
3. 25.0% MMA; 61.7% BMA; 13.6% acrylated HEMA
4. 15.5% MMA; 73.0% BMA; 11.5% acrylated HEMA

SET 2

1. 11.0% acrylated HEMA; 52.2% BMA; 36.8% MMA
2. 15.7% acrylated HEMA; 51.6% BMA; 32.7% MMA
3. 20.5% acrylated HEMA; 46.9% BMA; 20.5% MMA
4. 21.2% acrylated HEMA; 49.4% BMA; 29.4% MMA

SET 3

1. 35.8% MMA; 52.2% BMA; 12.0% acrylated HEMA 2. 36.8% MMA; 52.2% BMA; 11.0% acrylated HEMA
3. 35.8% MMA; 53.2% BMA; 11.0% acrylated HEMA
4. 37.3% MMA; 53.2% BMA; 8.2% acrylated HEMA
5. 37.3% MMA; 50.9% BMA; 11.8% acrylated HEMA
6. 36.0% MMA; 51.1% BMA; 12.9% acrylated HEMA
7. 36.9% MMA; 50.1% BMA; 13.0% acrylated HEMA

EXAMPLE 3

Modification Reactions to Produce Copolymer (I) in Monomer

Modification reactions were carried out using the same method as described previously however the copolymer was dissolved in monomer instead of the solvent acetone. The following monomers were used:

1. Tripropylene glycol diacrylate TPGDA
2. Isobornyl acrylate IBA

The reactions were performed in an identical fashion to that described in Example 2. At the end of the reaction, the solution was diluted so that the copolymer was at a concentration of 10% by weight and then the urea salt was filtered off as described previously. The filtrate solution was analysed by NMR to deduce the copolymer composition and to determine the level of any unreacted DCC. NMR showed that most hydroxyl groups had been converted to acrylates.

EXAMPLE 4

Formulation into a Curable Coating Composition

The following solutions were prepared using the copolymers of Example 1 (comparative) and of Example 2 at a level of 10% by weight in acetone:

1 Example 1 copolymer+6% (by weight on polymer) photoinitiator Irgacure 907
2 Example 2 copolymer+6% (by weight on polymer) photoinitiator Irgacure 907

These solutions were then coated onto 175 $\mu$m 'O' Melinex (trademark of Imperial Chemical Industries plc) using a 7 k bar (to give a coating of 7.5–8 $\mu$m). All samples were then UV cured using a minicure set at 5 m/min, 2 passes (lamp power 80 W.cm$^{-2}$).

Attempts to dissolve the films in two different solvents. acetone and toluene, after curing demonstrated that those films formed from 1 were soluble whereas films formed from 2 were insoluble.

EXAMPLE 5

Suspension Polymerisation to Produce Acid Functionalised Copolymer (II) Followed by Modification Reaction to Produce Copolymer (I)

An acid functionalised copolymer was prepared by suspension polymerisation, under the conditions described in Example 1, of the monomers MMA, BMA and methacrylic acid (MAA) in the presence of DDM, ADIB and polymethacrylic acid dispersant in deionised water. The composition of the copolymer was by weight 36% MMA; 54% BMA; 10% MAA.

A modification reaction was conducted on this copolymer, under the conditions described in Example 2, using dimethylamino pyridine DCC and hydroxy ethylacrylate to prepare the acrylated copolymer.

EXAMPLE 6

Suspension Polymerisation to Produce Copolymer (II) Followed by Partial Modification Reactions then Formation into Curable Coatings A hydroxy functionalised copolymer was prepared, under the conditions described in Example 1. with the composition by weight 62% MMA; 30% BMA; 8% HEMA and labelled as 6A.

Modification reactions were conducted, under the conditions described in Example 3, using TPGDA as solvent and varying the levels of acrylic acid added, resulting in the following conversions of HEMA to acrylate functional groups:

| | |
|---|---|
| 6A1 | 50% |
| 6A2 | 40% |
| 6A3 | 15% |

To the resulting solutions of acrylate functionalised copolymers in TPGDA photoinitiator and co-initiator (% by weight) were added as follows:

10% acrylate functionalised copolymer+80% TPGDA+ 5% Irgacure 500 photoinitiator (ex Ciba Geigy)+5% amine co-initiator P115 (ex UCB)

These solutions were then coated on to paper substrates at a thickness of 12 $\mu$m and the samples UV cured using a Primarc curing unit with a mercury pressure lamp set at a cure speed of 20 m. min$^{-1}$ (lamp power 80 W.cm$^{-2}$).

Solvent resistance to methyl ethyl ketone (MEK) was assessed by rubbing the coating with a cloth saturated with MEK, the result given as the number of double rubs before the coating failed.

Gloss was determined using a reflectometer at an angle of 60 degrees after calibration with a highly polished glass plate of refractive index 1.567.

| Sample | Solvent Resistance | Gloss |
|---|---|---|
| 6A | 50 | 89 |
| 6A1 | 95 | 90 |
| 6A2 | 120 | 90 |
| 6A3 | 101 | 91 |

EXAMPLE 7

A hydroxy functionalised copolymer was prepared, under the conditions described in Example 1, with the composition by weight 58% EMA; 34% BMA; 8% HEMA and labelled as 7B. This was modified under the same conditions as 6A in Example 6 resulting in the following conversions of HEMA to acrylate functional groups:

| | |
|---|---|
| 7B1 | 60% |
| 7B2 | 30% |
| 7B3 | 15% |

To the resulting solutions of the acrylate functionalised copolymers photoinitiator and co-initiator were added as for 6A in Example 6. These solutions were then coated and cured using the same conditions as applied to 6A in Example 6. The solvent resistance and gloss levels are reported below:

| Sample | Solvent Resistance | Gloss |
|---|---|---|
| 7B | 30 | 90 |
| 7B1 | 95 | 88 |
| 7B2 | 90 | 88 |
| 7B3 | 55 | 88 |

Examples 6 and 7 demonstrate that cured coatings comprising copolymers containing acrylate functional groups provide improved solvent resistance compared with coatings comprising copolymers without these functional groups whilst retaining gloss:

EXAMPLE 8

Formulation into Curable Coating Compositions

To the solutions of acrylate functionalised copolymers in TPGDA. as described in Example 6, oligomer, photoinitiator and co-initiator (% by weight) were added as follows:

10% acrylate functionalised copolymer+40% Ebecryl 81, polyurethane-acrylate oligomer (ex UCB)+40% TPGDA+5% Irgacure 500+5% amine co-initiator P115

The coatings were formed and cured, as described in Example 6, but at a cure speed of 3.5 m. min$^{-1}$. Results obtained were as follows:

| Sample | Solvent Resistance |
|---|---|
| 7B | 20 |
| 7B2 | 120 |

EXAMPLE 9

A similar formulation was made up to that in Example 8 where Ebecryl 81 was replaced by Ebecryl 605, polyester-acrylate oligomer (ex UCB).

The coatings were formed and cured, as described in Example 6, but at a cure speed of 60 m. min$^{-1}$. Results obtained were as follows:

| Sample | Solvent Resistance |
|---|---|
| 6A | 30 |
| 6A2 | 65 |

What is claimed is:

1. A composition comprising a copolymer of formula (I)

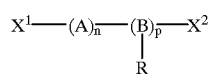
(I)

wherein
A represents a residue of at least one (meth)acrylate monomeric species;
B represents a residue of at least one monomeric species copolymerizable with A;
R represents a (meth)acrylate functionalized pendant ester group;
$X^1$ and $X^2$ represent terminal groups which may be the same or different;
n and p are both at least one and are chosen such that the copolymer has a number average molecular weight of more than 2000; and
a solvent that is a functionalized oligomeric species having a number average molecular weight of 2000 or less and/or a reactive monomeric species, wherein said copolymer is obtained by
  (i) polymerizing by free radical polymerization the at least one (meth)acrylate monomeric species providing residue A with the monomeric species providing residue B to form a copolymer of formula (II)

(II)

wherein Y is a pendant reactive group capable of undergoing esterification,
  (ii) dissolving the copolymer (II) in the solvent; and thereafter
  (iii) esterifying the pendant group Y with a moiety that carries both the reactive group Q capable of undergoing esterification with the group Y and also a (meth)acrylate group so as to form groups R in the presence of a agent of the formula (III)

(III)

wherein
$Z^1$ and $Z^2$ are end groups which are capable of assisting in the solubilization of the reagent by the solvent.

2. A composition of claim 1, wherein $Z^1$ and $Z^2$ are selected from the group consisting of substituted $C_3$ to $C_{16}$ alkyl, $C_5$ to $C_6$ cycloaliphatic, phenyl or tolyl.

3. A coating formed by curing a composition, further comprising a copolymer of formula (I)

(I)

wherein
A represents a residue of at least one (meth)acrylate monomeric species;
B represents a residue of at least one monomeric species copolymerizable with A;
R represents a (meth)acrylate functionalized pendant ester group;
$X^1$ and $X^2$ represents terminal groups which may be the same or different;
n and p represents both at least one and are chosen such that the copolymer has a number average molecular weight of more than 2000; and
a solvent which is cross-linkable oligomeric species and/or reactive monomeric species having a number average molecular weight of less than 2000, wherein said copolymer is obtained by
  (i) polymerizing by free radical polymerization the at least one (meth)acrylate monomeric species providing residue A with the monomeric species providing residue B to form a copolymer of formula (II)

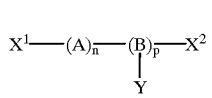

(II)

wherein Y is a pendant reactive group capable of undergoing esterification,
(ii) dissolving the copolymer (II) in the solvent; and thereafter
(iii) esterifying the pendant group Y with a moiety that carries both the reactive group Q capable of undergoing esterification with the group Y and also a (meth)acrylate group so as to form groups R in the presence of a agent of the formula (III)

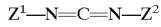

(III)

wherein
$Z^1$ and $Z^2$ are end groups which are capable of assisting in the solubilization of the reagent by the solvent.

4. A coating of claim 3, wherein $Z^1$ and $Z^2$ are selected from the group consisting of substituted $C_3$ to $C_{16}$ alkyl, $C_5$ to $C_6$ cycloaliphatic, phenyl or tolyl.

* * * * *